April 5, 1966 P. J. POWER 3,244,134

CATAMARAN-TYPE-CRAFTS

Filed July 20, 1964 5 Sheets-Sheet 1

Inventor:
Paul John Power
By Leaman + McCulloch

April 5, 1966 P. J. POWER 3,244,134

CATAMARAN-TYPE-CRAFTS

Filed July 20, 1964 5 Sheets-Sheet 2

Inventor:
Paul John Power
By
Learman & McCulloch

Inventor:
Paul John Power
By
Learman & McCulloch

April 5, 1966 P. J. POWER 3,244,134
CATAMARAN-TYPE-CRAFTS
Filed July 20, 1964 5 Sheets-Sheet 4
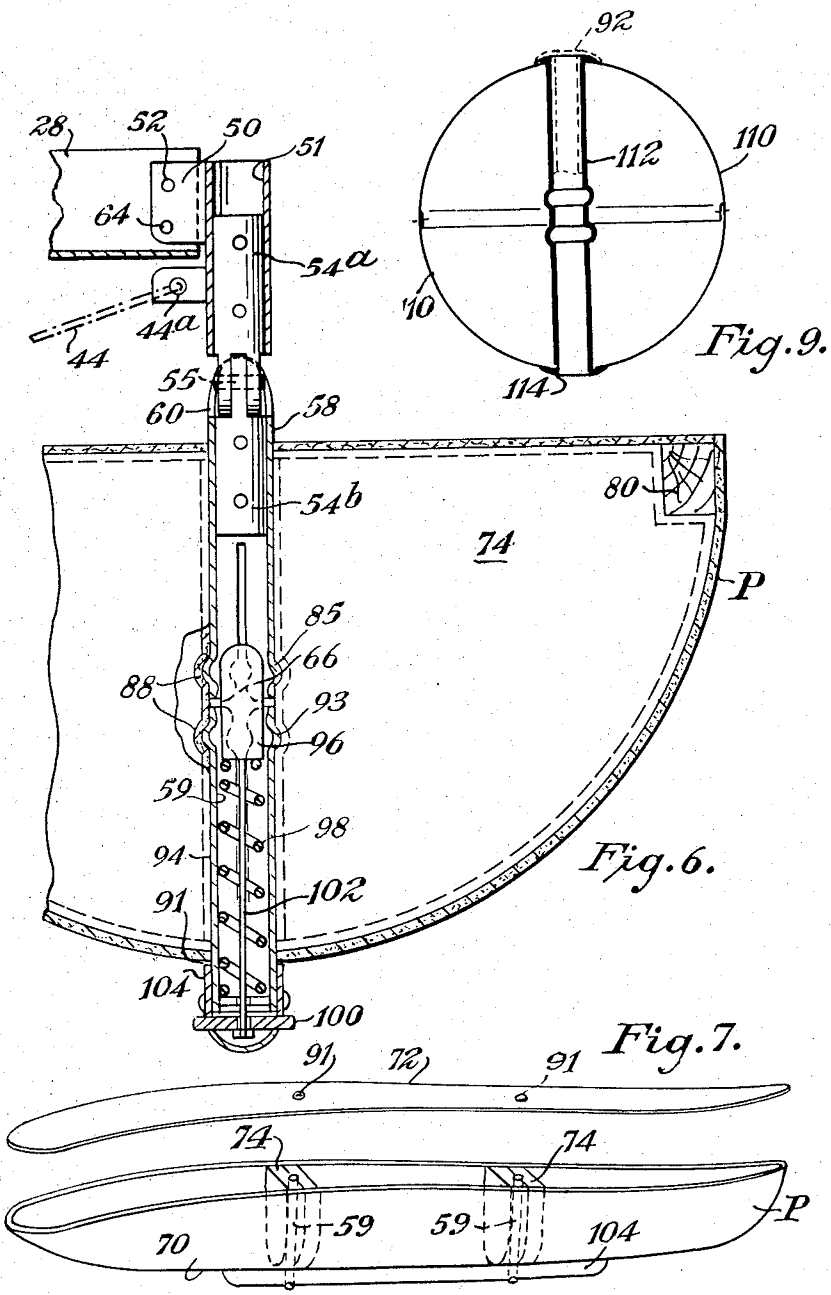
Inventor:
Paul John Power
By
Learman & McCulloch Inventor:
Paul John Power
By Kearman & McCulloch United States Patent Office 3,244,134

Patented Apr. 5, 1966

3,244,134

CATAMARAN-TYPE-CRAFTS

Paul John Power, Dublin, Ireland, assignor to Pacamaran International Limited, Dublin, Ireland, a corporation of Ireland Filed July 20, 1964, Ser. No. 383,806
Claims priority, application Republic of South Africa, July 23, 1963, 3,322/63; Aug. 22, 1963, 3,812/63; Great Britain, Mar. 17, 1964, 11,186/64
13 Claims. (Cl. 114—123)

This invention relates to waterborne craft of the type generally referred to as catamarans or trimarans and to land craft such as sand or ice yachts, which craft may comprise a framework which in use is supported by two or more spaced hulls or floats or equivalent craft-supporting means. The term "craft-supporting means" where used in this specification is intended to include, for example, wheels, skids, skates, or skis, the selection of the supporting means being dependent upon the function for which the craft is designed.

It is an object of the present invention to provide a portable framework for craft of the type described, which framework is easily folded or collapsed, when not required for use, without the necessity of employing any tools or other mechanical aids.

According to the present invention, a portable framework of the type described comprises a rigid main beam, at least one pair of outrigger arms, means for securing the outrigger arms to the main beam and means for attaching craft-supporting means to the outrigger arms, the said outrigger arms being displaceable between an extended state in which the arms of each pair extend normal to an on opposite sides respectively of the longitudinal axis of the main beam and a collapsed state in which the arms lie substantially parallel to the main beam and within the length thereof, the arrangement of the arms being such as to permit of their being displaced between their extended and their collapsed state without removal of the craft-supporting means, when attached.

Preferred embodiments of the invention are described hereinafter with reference to the accompanying drawings in which:

FIGURE 3*a* is a plan view of same;

FIGURES 4 and 5 are explanatory plan views of a modified connection between the main beam and the outrigger arm;

FIGURE 6 is a detail view showing the connection between an outrigger arm and a reversible rigid pontoon;

FIGURE 7 is a perspective view of a rigid reversible pontoon;

FIGURE 9 is an end view in section of an inflatable pontoon and

Figure 1:
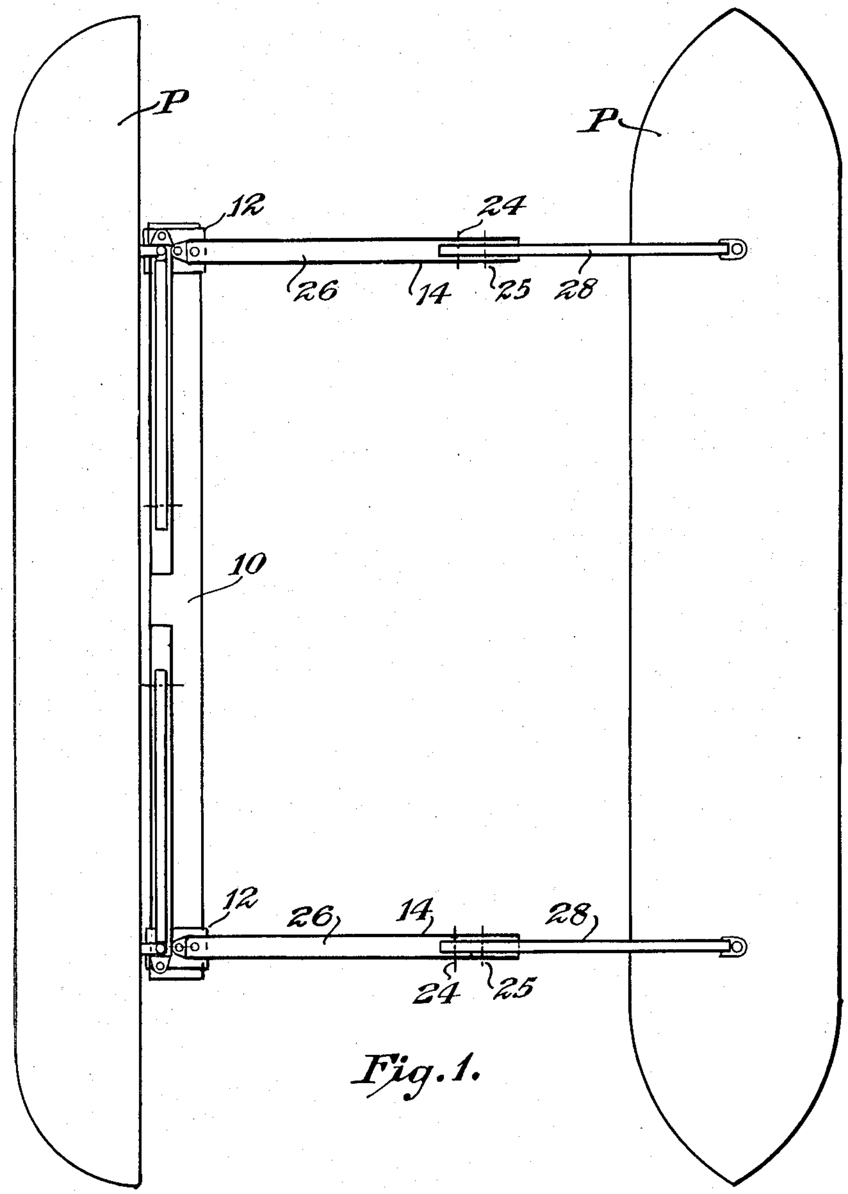
FIGURE 1 is a diagrammatic plan view of a portable framework with pontoons attached, showing one pair of outrigger arms collapsed and the other pair of arms, in the extended position.

Referring to FIGURES 1 to 6 of the drawings a framework for a twin-float catamaran comprises a straight tubular main beam or spine 10 of substantially square cross-section, to which is attached adjacent each end thereof, a bracket 12 for supporting a pair of foldable outrigger arms 14.

Each bracket 12 (see FIGURE 3) is in the form of a saddle, comprising a top plate 16 and spaced side plates 18, the latter each having an inwardly directed rib 19. The internal dimensions of the brackets 12 are chosen such as to enable them to be slid over opposite ends respectively of the beam 10, into positions adjacent each end thereof. In order to lock the brackets 12 to the beam 10, threaded pins 20, each having a flange **20*a* are inserted through apertures 22 in the side plates 18 and engaged in opposite ends of an internally threaded sleeve 21, so arranged that, by rotation thereof the flanges 20*a* are drawn towards each other and thus compress the beam 10, which is formed with sawcut slots 13 between the side walls 18 of the bracket 12. If telescopic extensions 132 are fitted within the main beam, they are held fast by the compression of the sawcut ends of the beam 10**.

The outrigger arms 14 which are preferably of channel section, each include within its length a hinge or pivot connection 24, which divides the arm into inner and outer arm elements, indicated at 26 and 28 respectively. The connection 24 permits the two elements either to be rigidly locked together when extended in their operative position, by means of a locking pin 25, and when in a stowed position, folded one within the other.

Figure 3:
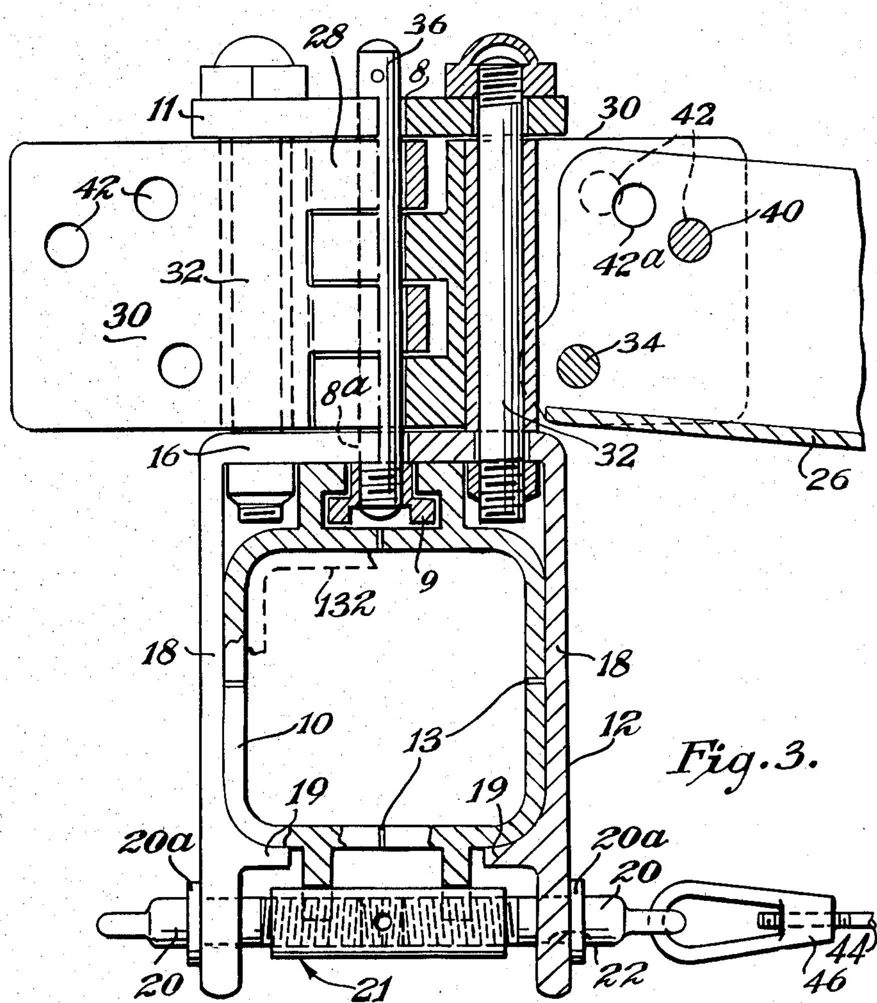
FIGURE 3 is a detail end view partly in section showing the connection between an outrigger arm and the main beam of the framework.

The inner end of each arm element 26 is pivotally attached to the bracket 12 by means of a shoe mounting 30, the two mountings being hingedly interconnected and attached to the bracket 12 by means of bolts 32, which provide fulcrums so as to permit the arms 14 to be swung from the extended position of FIGURE 3 and as represented by the right hand pair in FIGURE 1, to the closed or stowed position where they overlie the beam 10, as represented by the left hand pair in FIGURE 1.

The bolts 32, in the embodiment shown, are double ended and are threaded through holes in the top plate 16 and through corresponding holes in an upper plate 11, in which is formed a hole 8. Hole 8 is in vertical alignment with hole **8*a* and with a holding nut 9 located in an undercut recess on the upper side of the beam 10**.

It will be seen that the shoe mountings 30 have interlocking ears 28 which when the arms 14 are extended, register with the holes 8, **8*a* to receive a locking pin 36, which pin is threaded to engage the holding nut 9**.

Angular movement of the arms 14 in the vertical plane within their respective shoes 30 is provided for by means of fulcrum pins 34 which are engaged in holes in the side walls of each shoe. Dihedral may be imparted to the outrigger arms 14 by upward or downward angular displacement thereof, the arms 14 being retained in the required inclined position, by means of a locking pin 40 inserted in one of a series of apertuers 42 in the side walls of each shoe 30, the pins 40 being engaged in one or other of transversely registered holes in the sides of the channel of the arm element 26. In their extended position, the arms 14 are tensioned by stays or wires 44, extending between the extremity of outer arm element 28 (secured to an anchorage **44*a*) and the associated bracket locking pin 20 and each includes a tensioning device, for example a bottle screw 46** (FIGURE 3).

An alternative arrangement for locking the outrigger arms in the extended state is illustrated in FIGURES 4 and 5. In this case the shoe plates, indicated respectively at 31, **31*a*, are hingedly connected to the bracket 12 by pins 33 and are each formed with a rectangular corner 41 and a radiused corner 43, so arranged that when the arms are extended, the respective rectangular corners 41 of each shoe plate 31, abut each other and thus prevent the arms 14, which are attached to the plates 31, from being angularly displaced, in the horizontal plane, beyond a right angle to the beam 10**.

In a framework fitted with modified shoes 31 and two pairs of outrigger arms supporting a pair of rigid pontoons, it will be understood that the provision of locking bolts 36, as shown in FIGURE 3*a*, is not required since when the pontoons are in position with the arms extended, the ends of the arms are rigidly held against displacement. However, to provide additional rigidity in the extended position, a locking bolt 45 is inserted in a hole **45*a* in the bracket 12, the bolt 45 being located in slots 47 in each of the radiused corners 43 of the shoes 31**.

Figure 2:
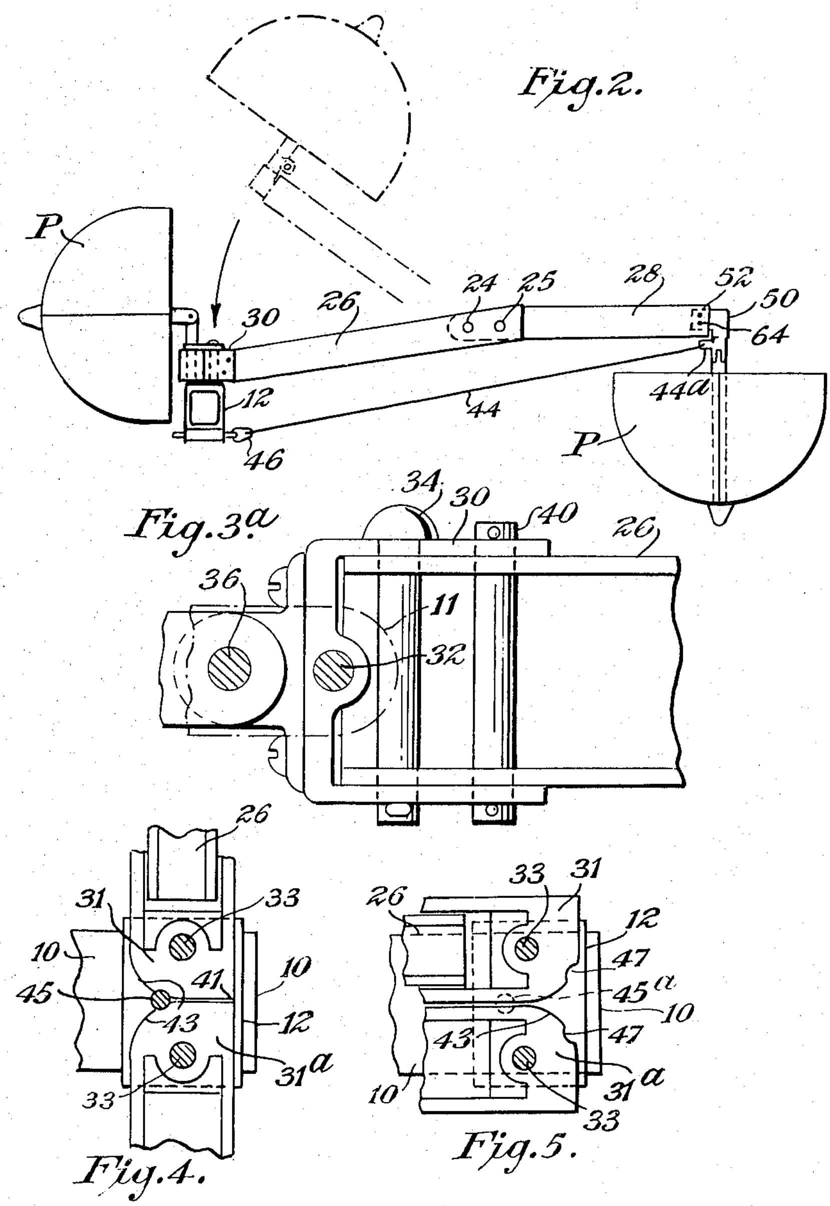
FIGURE 2 is an end view of the framework shown in FIGURE 1.

Each float or pontoon is releasably secured to its outrigger arm 14 by means which permit relative movement between the pontoon and the outriger arm in planes normal to each other, so that when the outrigger arms 14 are folded, each pontoon can be tilted and as the arms swing into their folded position, the pontoon is free to move about its pivot, whilst maintaining parallelism with the beam 10 until the pontoon lies against the beam as shown in the left hand side of FIGURE 2, the intermediate positions being shown in dotted lines.

The connection between the outrigger arms and the pontoons P consists of a pin and socket type connector, the male component of which consists of a tubular pin 58 which engages a vertical socket, indicated generally at 59 (see also FIGURE 7) in bulkheads 74 fitted within each pontoon P. The male connector 58 is attached to the outrigger outer arm 28 by one **54*b* of two pins 54*a*, 54*b* which are pivotally jointed by a pin 55 the axis of which is paralled to the outer arm 28. The other 54*a* of the two said pins is fast in a socket 51 formed in a mounting block 50 which projects beyond the end of the outer arm 28, the block 50 being fastened to the latter by a fulcrum pin 52 so that, as hereinafter explained, it can be swung to an inoperative position for stowage. The block 50 is held in its operative position by a locking pin 64 (FIGURE 2) which is passed through a hole in the block 50 and engages in holes in the side walls of the outer arm 28**.

The axis of the pivotal connection 55 between the pins **54*a* and 54*b* is so arranged that the pins are locked in axial alignment when the outrigger arms are extended with the pontoons attached and to permit of angular displacement of the pins only when the outrigger arms are folded back parallel to the main beam as depicted in the left hand side of FIGURE 2. This locking/release action is arranged by imposing mechanical limitations on the angular displacement of the pins, such that when the arms 14 are extended, the individual pins 54*b* of each pair of pins 54*b* on either side of the beam 10, would, if the pontoons were removed, be displaceable only away from each other i.e. in opposite directions. The outer or free end of the male component 58, which has slotted extremities 66 to facilitate insertion into socket 59 in pontoon P, is also provided with locating ribs 85**.

Referring now to FIGURE 7, there is illustrated a pontoon P of rigid construction comprising a hull 70 of substantially semi-circular cross-section at its mid-point between its ends, and provided with a flat or substantially flat deck 72. The hull 70 and deck 72 are preferably each of integral moulded construction, for example moulded in high-impact polystyrene or glass fibre.

Figure 8:
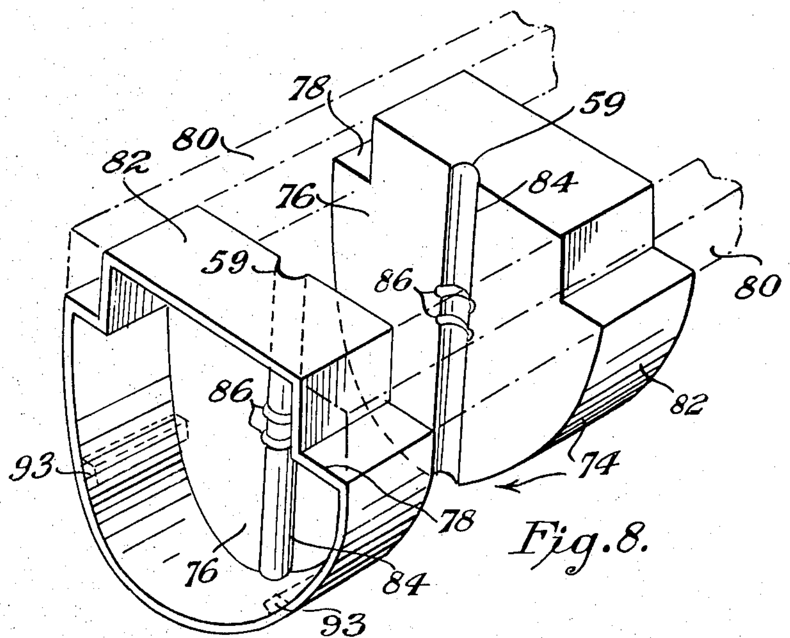
FIGURE 8 is a perspective view of a bulkhead component for a rigid pontoon.

Mounted within the hull 70 at suitably spaced locations are pairs of transverse bulkheads 74 which are illustrated in detail in FIGURE 8. A pair of bulkheads 74, is shown prior to being assembled together. Each bulkhead 74 consists of a wall 76 the general outline of which conforms to the internal cross-section of the hull, apart from the removal of corner portions of the wall to define shoulders 78, for accommodating longitudinal hull-strengthening members 80 shown in broken lines in FIGURE 8. Each bulkhead wall 76, which is reinforced by a peripheral flange 82 has a vertical groove or half-channel 84 of semi-circular cross-section, which grooves 84 when mated, together provide the socket 59.

In the channel 84 are two axially separated recesses 86, which together form a pair of annular grooves 88 within the socket 59. Optionally a tubular metal liner 92 having the same configuration as the socket 59 may be inserted therein. The bulkhead components 74 are preferably secured to each other by an adhesive, for example by being bonded together with cement, the assembled pairs of components 74 being cemented within the hull at suitably spaced points therein, matching the spacing of the pairs of outrigger arms. Apertures 91 are provided both in the hull 70 and deck 72 to register with the sockets 59 in the components 74. Slots 93 may be provided in the bulkheads to receive additional longitudinal strengthening members 80.

The method by which the pontoon P is secured to outrigger arm 14 will now be described with particular reference to FIGURE 6.

Assuming the framework has been extended with both pairs of arms 14 in the position shown in the right hand side of FIGURE 1, and that the pins **54*a* and 54*b* are placed in axial alignment, the male connector i.e. tube 58 which now depends from the outrigger arm 14, is inserted into the socket 59 until its locating rib 85 engages the uppermost one of the grooves 88**.

The pontoon is locked to the male connector 58 by a contractile locking pin 94. Pin 94 which has a rib 93 and is slotted in a similar manner to the connector 58, contains a solid plunger 96, axially displaceable within the pin 94 against the bias of a spring 98, is inserted in the other end of the socket 59, the plunger 96 having previously been withdrawn within the locking pin 94, away from its slotted end, by means of a toggle 100 connected to the plunger 96 by a rod 102.

Pin 94 is inserted in socket 59 until the rib 93 engages the lowermost of the grooves 88, whereupon release of the toggle 100 allows the plunger 96 to return through the pin 94 until it takes up a position where it positively prevents both the male connector 58 and the pin 94 from being withdrawn from the grooves 88. The pin 94 may additionally support an anti-scuff bar or member 104 which extends along and beneath the pontoon P.

Release of the pontoon may be effected by a similar but reverse method to that just described. The connector 58 and pin 94 may be inserted in either end of the socket 59 thus enabling the pontoon to be reversibly attached either with its flat side or its rounded bilge side facing downwards, so providing the advantage of a selection, in use, of either a conventional hull form or of a planing surface.

The framework may be fitted with inflatable pontoons in lieu of the rigid construction pontoon which has been described. FIGURE 9 illustrates, in section, an inflatable pontoon comprising two complementary top and bottom sheets 110 of an air-impermeable material, for example polyvinylchloride, joined along their edges to form an elongated cylindrical shaped pontoon tapering at each end. The inflatable pontoons are attached to the outrigger arms 14 of the framework in a similar manner to that by which the rigid pontoons are attached. For this purpose a tubular liner 112, preferably of hard rubber, and having a similar configuration to the socket 59 in the rigid pontoon, is inserted between the top and bottom sheets 110 of the inflatable pontoon. The liners are provided at each end with an annular flange 114 to which the sheet material of the pontoon is cemented to form a watertight joint.

Figure 10:
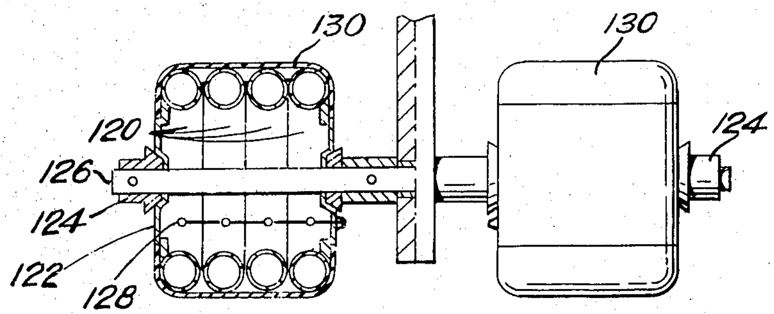
FIGURE 10 is a schematic elevation partly in section of an inflatable amphibious pontoon.

Referring to FIGURE 10, to enable the catamaran craft to be used on land, for example a sand beach as well as on water, amphibious pontoons may be provided, which pontoons may comprise a plurality of vehicle tyre inner tubes 120, for example four, axially aligned between two light weight dished discs 122 and hubs 124 provided with apertures forming bearings for an axle 126 to be passed therethrough. The tubes 120 are connected to each other through valves 128 for simultaneous inflation or deflation and are provided with a protective outer cover 130. Two such assemblies are rotatably attached to each of the outrigger arm 14 of a catamaran and one to the centre beam 10, so that when inflated the assemblies serve both as wheels on land and as floats on water, rotation of the amphibious pontoons due to the craft's movement through the water serving to reduce friction.

It will thus be understood from the foregoing description that the construction of the framework permits on removal of the locking bolts 36 and 40 the outrigger arms 14 to be folded against the beam 10 into positions in which they lie upon and substantially parallel to the main beam and substantially within the overall length and width thereof, it being unnecessary to detach the pontoons from the arms in order to fold the framework. When the latter are attached to the arms 14 on each side of the main beam respectively, the pivotal connection between the pontoons P and the arms 14 allows the pontoons when the framework is folded, to lie parallel to and close up against the main beam, thus providing an extremely compact arrangement when the craft is not in use or for transportation. When thus folded, the axles of a pair of road wheels may be inserted into the sockets 59 in the pontoons in lieu of the locking pins 94, so as to permit the framework to be towed on land.

The centre beam 10 of the framework may optionally incorporate or be adapted to receive longitudinal extension members 132 (FIG. 3). These conveniently may be arranged to telescope within the main beam when not in use. Alternatively they may be hinged to or bolted to the main beam. The framework is preferably constructed of aluminium extrusions, the design of the components having been so chosen as to facilitate production in this manner.

Ancillary equipment, for example a mast, rudder, centre board, and a fixed or sliding seat may be detachably secured to the centre beam 10 by means of, for example, additional brackets, similar to the brackets 12, suitably located on the main beam 10.

Provision may be made for extending the framework from its folded state to its extended state by means of compressed air or gas stored in a cylinder attached to the main beam 10. For this purpose conduits of collapsible tubing may be led from the centre beam along the outrigger arms to inflatable pontoons. When gas is introduced into the collapsed tubing, the latter expands and causes the folded members to unfold and the pontoons to be inflated.

It will readily be understood that numerous other modifications may be made to the craft of the present invention. A pedal operated paddle wheel or outboard motor may be fitted as an alternative means of propulsion. The mast and sails may be substituted by a canopy functioning as a sun shield or by a free rotor or kite structure to enable the craft to become air borne when towed. For use as an ice yatch extension members may be attached to the extremities of the outrigger arms and the latter provided with negative dihedral with respect to the centre beam 10, skates or runners being attached to the outer ends of the extension members.

Whilst in the preferred embodiments which have been described in the framework and outrigger arms are formed of aluminium it will be understood that alternative materials for example timber, may be utilised in lieu.

What is claimed is:

1. A portable folding craft comprising a rigid centre beam, two pairs of foldable outrigger arms, means spaced apart lengthways along said beam for connecting each pair of outrigger arms to said centre beam, said connecting means each including pivots permitting angular displacement of each arm relative to the beam, in a first plane parallel to the longitudinal axis of the beam and in a second plane normal to said first mentioned plane, the arms of each pair of arms each comprising an inner and an outer arm element and when unfolded extending normal to the longitudinal axis of the centre beam and on opposite sides respectively thereof, at least two detachable support elements, and means for pivotally connecting the support elements to the ends of the outrigger arms on each side of the centre beam, said pivotal connections permitting the outrigger arms to be folded, without removal of the support elements, so that the arms and the support elements lie parallel and adjacent the centre beam with the arms disposed between the support elements and within the spacing between each of said first mentioned connecting means.

2. A portable folding craft according to claim 1 wherein each of said support elements comprises a rigid hollow pontoon of substantially half-circular cross-section providing a substantially flat surface for planing and a rounded bilge, and incorporating means by which the pontoon may be attached to the outrigger arms with the flat surface or the rounded bilge uppermost.

3. A portable folding craft comprising, in combination, a rigid centre beam, two pairs of foldable outrigger arms, means spaced apart lengthways along said beam for pivotally connecting each pair of outrigger arms to said centre beam, said connecting means each comprising a bracket mounted on said beam and including vertical and horizontal pivot axes for permitting angular displacement of said arms in a horizontal plane parallel to the longitudinal axis of the centre beam and in a vertical plane; each outrigger arm including an inner and an outer arm element of channel section and a pivotal connection therebetween, the arms of each pair when unfolded extending normal to and on opposite sides respectively of said centre beam; a pair of detachable rigid pontoons, means pivotally connecting each pontoon to one arm of each pair of outrigger arms, and said pivotal connections permitting the outrigger arms to be folded, without removal of the pontoons, so that the arms and pontoons lie parallel and close to the centre beam with the arms disposed within the lengthwise spacing between said brackets and overlying the centre beam and with each outer arm element at least partially accommodated within its associated inner arm element.

4. A portable folding craft comprising a rigid centre beam, two pairs of outrigger arms, means longitudinally spaced apart along said centre beam pivotally connecting each pair of outrigger arms to said centre beam, said connecting means each comprising pivot means permitting angular displacement of each arm relative to the centre beam in two planes, the arms of each pair when unfolded extending on opposite sides respectively of said centre beam and normal thereto, a pair of detachable pontoons, means pivotally connecting the pontoons to the outrigger arms on opposite sides respectively of the centre beam and permitting angular displacement in two planes between the arms and the pontoons; said pontoons each comprising a rigid reversible hollow hull of substantially semi-circular cross section providing a substantially flat surface for planing and a rounded bilge, and incorporating means by which the hull may be attached to the outrigger arms with the flat surface or the rounded bilge uppermost.

5. A portable folding craft as claimed in claim 4 wherein said rigid hollow hull includes at least one internal transverse bulk-head which bulk-head comprises a pair of mating components together forming a tubular socket extending vertically through the pontoon and terminating in ends flush with said planing surface and said rounded bilge respectively and wherein said means pivotally connecting the pontoons to the outrigger arm each includes a pin receivable within either end of said socket in said transverse bulk-head.

6. A portable folding craft as claimed in claim 1 wherein said inner and outer arm elements are of channel section including spaced parallel side walls, the width of said outer arm element being less than that of said inner arm element whereby each outer arm element when required may be folded about its pivotal connection with its inner arm element so as to lie within said side walls of its inner arm element.

7. A portable folding craft as claimed in claim 1 wherein said pivotal connection between the outrigger arms and the centre beam includes means for adjusting the dihedral angle of said outrigger arms when said arms are extended.

8. A portable folding craft as claimed in claim 1 in which said main beam is provided with at least one longitudinal extension member telescopic within said main beam.

9. A portable folding craft as claimed in claim 1 including means for locking the outrigger arms when extended with the inner arm elements thereof inclined upwardly with respect to a horizontal plane passing through the centre beam and with the outer arm elements thereof substantially parallel to said horizontal plane.

10. A portable folding craft as claimed in claim 9 including means connecting the outer extremities of said outer arm elements to the centre beam for tensioning the outrigger arms when fully extended.

11. A portable folding craft as claimed in claim 1 wherein said support elements comprise wheels.

12. A portable folding craft as claimed in claim 1 where said support elements comprise inflatable pontoons.

13. A portable folding craft as claimed in claim 1 wherein said rigid centre beam comprises an extruded aluminum section.

No references cited.

MILTON BUCHLER, *Primary Examiner.*

T. M. BLIX, *Assistant Examiner.*